Oct. 1, 1935.   A. S. FITZ GERALD   2,016,036
PHOTO ELECTRIC SYSTEM
Filed Feb. 4, 1932   4 Sheets-Sheet 1

INVENTOR.
Alan S. FitzGerald

Oct. 1, 1935.　　A. S. FITZ GERALD　　2,016,036
PHOTO ELECTRIC SYSTEM
Filed Feb. 4, 1932　　4 Sheets-Sheet 4

INVENTOR.
Alan S. FitzGerald

Patented Oct. 1, 1935

2,016,036

UNITED STATES PATENT OFFICE 2,016,036

PHOTO-ELECTRIC SYSTEM

Alan S. Fitz Gerald, Wynnewood, Pa.

Application February 4, 1932, Serial No. 590,912

27 Claims. (Cl. 250—41.5)

My invention relates to photo-electric systems and, more particularly, to light sensitive apparatus actuated by the movement of an object, as in burglar alarms, vehicle signal systems and the like, and to apparatus for detecting spots or defects in materials.

The principal problem, in such systems, is to make the apparatus responsive to the specific effect which it is desired to detect, rather than to changes in general light intensity or other extraneous effects.

In systems hitherto known or used, this selective action has generally been obtained by employing arrangements by means of which the actuating effect causes a substantially greater change in the photo-cell illumination than any variation liable to be set up by any other cause.

Thus, in the majority of existing systems, a solid body, such as a person or an automobile, interrupts a concentrated beam of light, cutting off all, or nearly all, of the light affecting the photo-cell.

Such arrangements are only feasible for detecting the passage of an object at a definite and predetermined point. They cannot be actuated by an object which may be introduced anywhere in a general field of view.

It has not hitherto been known how to provide a photo-electric system which is capable of being actuated by an object which is relatively small in comparison with the field of view, and which may have an indeterminate position therein.

More simply, there has not been available a system resembling the action of a biological optical and nervous system which can perceive, and respond to, a small object anywhere in a wide field of view, and independent of the general light intensity; or, of the light reflected or transmitted by the background, or by other objects within the field of view. By the term field of view I mean the total solid angle "visible" by the photo-electric device in accordance with the lens system and/or the surrounding casing or housing.

Similarly, in material inspection systems, it has not hitherto been known how to provide apparatus capable of detecting a small spot in a wide sheet of material without utilizing costly arrangements, involving a very large number of individual photo-cells, each embracing a field of view not greatly exceeding the dimensions of the spot to be detected.

It is, therefore, an object of my invention to provide an improved photo-electric system by means of which the aforesaid limitations may be entirely overcome, so that movement of a free object, such as, for example, a person, vehicle, or airplane, anywhere within a wide field of view, and at a substantial distance from the photo-electric apparatus, may be detected. By the expression a free object I mean any object the movement or position of which is not necessarily determined by or related to the photo-electric apparatus, as distinguished from any functional member forming a part of, or which is associated with, the latter.

It is another object of my invention to provide a system capable of selective action in accordance with the direction of motion of an object. For example, my invention may be made operative in the case of vertical motion, and may be inoperative if the motion be horizontal, or vice versa.

It is also an object of my invention to provide a system capable of operating selectively in accordance with the sense of the motion of an object. Thus, the system may be arranged to give a characteristic response when the movement is from right to left, but may respond in a different manner if the movement be from left to right; or, it may discriminate between upward and downward movements.

It is a further object of my invention to provide a photo-electric trespass detecting system which may be inoperative when an object, as, for example, an authorized person, passes across the field of view by a specific path or itinerary, but which may be actuated when a person follows any other path.

It is also an object of my invention to provide improved and more economical photo-electric inspection apparatus for detecting spots or imperfections in sheets, etc. of material, by means of which defects, smaller in relation to the size of the sheet, than hitherto possible, may be detected.

Thus, both in the detection of distant objects or small variations in materials, my invention is characterized particularly by the fact that the actuating effect occupies only a minute portion of the field of view and represents a light variation of which the amplitude is very small indeed in comparison with the total light which the photo-cell receives. Under such circumstances the total illumination affecting the photo-cell may remain substantially constant, thus distinguishing my invention from the generality of photo-electric applications of the light-beam-interception type wherein variations of substantial amplitude in the total illumination of the light sensitive device are caused.

It is a further object of my invention to provide a material inspection system of the type above specified, in which the material may be passed at a higher speed than heretofore.

The above objects are attained in a most effective manner, by virtue of the following principal features of novelty of my invention.

Whereas, the majority of known light sensitive systems are responsive to the difference in the illumination of the photo-cell when an object is, respectively, present or absent, the present invention is actuated by the motion of the object. It being an object of my invention to approach the characteristics of a biological eye, the relevance of this feature of my invention, to the problem involved, is immediately evident, if the relative perceptibility to a huntsman, of a sitting or running animal, respectively, be considered.

This result I achieve by exhibiting the field of view to the photo-sensitive element through special screens or gratings, by means of which continuous movement of an object causes a fluctuating or alternating component in the photo-electric current.

A second feature of my invention, in its preferred form, is that I utilize a double optical system, together with a balanced bridge type of photo-electric circuit, due to which my photo-electric system is entirely unaffected by any kind of change in the general illumination of the field of view.

A third feature of my invention is that I provide an electric circuit, cooperating with my light sensitive system, which is responsive only to the rate of change of photo-electric current.

A fourth feature of my invention, in its preferred form, is that the said electric circuit is responsive only to rate of change of unbalance of the photo-electric bridge circuit.

Thus, whereas most previously known systems, as above explained, are responsive to a quantitative difference between two intensities of illumination, the present invention is actuated by a qualitative effect. When there is no moving object, there is no alternating component in the photo-electric current. When an object moves in the field of view, an alternating component is thereby created.

Since the presence or absence of a characteristic effect can obviously be more readily detected than a difference of magnitude of two like effects, my invention permits of much greater amplification, and much higher effective sensitivity to small moving objects in a wide field of view, than has hitherto been possible.

The novel features which I consider characteristic of my invention are set forth with particularity in the appended claims. The invention itself, however, both as to its organization and its method of operation, together with additional objects and advantages thereof, will best be understood from the following description of a specific embodiment when read in conjunction with the accompanying drawings, in which:

Figure 1:
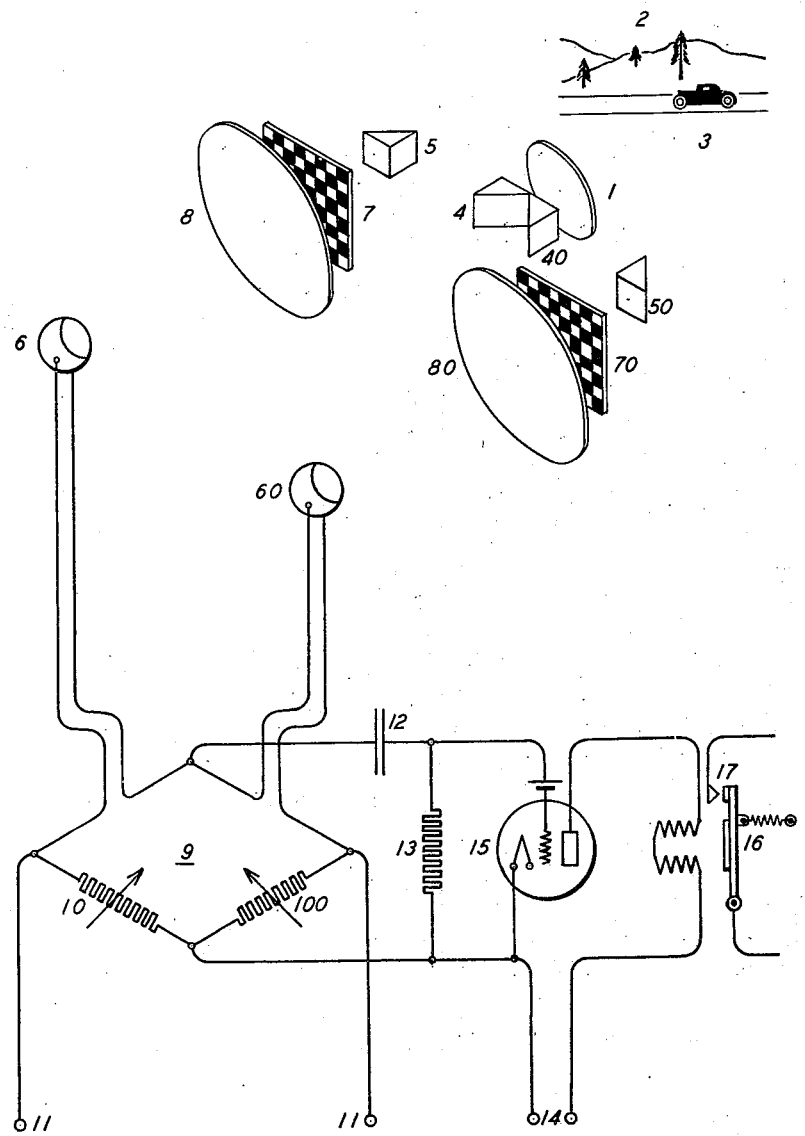
Fig. 1 is a diagrammatic representation of an embodiment of my invention adapted to be operated by a moving object.

According to an embodiment of my invention shown in Fig. 1, I provide a lens 1, embracing an optical field 2, which includes a movable object 3, distinguishable by color or shade from its background or surroundings. Light falling upon the lens 1 is transmitted, by means of reflecting prisms 4, 40 and 5, 50, to form two parallel beams arranged, respectively, to actuate a pair of similar photo-sensitive elements 6, 60. A pair of condensing lenses 8, 80 serves to concentrate the light on to the latter.

The lens 1, in conjunction with the prisms 4, 40, 5, 50—4 and 40 being positioned in proximity to the lens 1—tends to set up duplicate images of the field 2 at the focal plane, corresponding to the power of the lens. This arrangement, it will be apparent to those skilled in the art, is an obvious optical equivalent of providing two complete, duplicate, optical systems, each embodying a separate objective lens 1, no prisms being employed, which latter arrangement, may, of course, be used, if desired, in carrying my invention into effect.

The condensing lenses 8, 80 are mounted slightly beyond the focal plane. Approximately at the focal plane, I provide two specially arranged divided screens 7, 70 through which all light reaching the photo-sensitive elements has to pass.

The two screens 7, 70 are divided into a number of small portions alternately transparent and opaque. The divisions may be regular or irregular, and may be according to various shapes or patterns; but, both screens are exactly identical in pattern and are of opposite characteristics. That is to say, if any portion of screen 7 is opaque, the corresponding section of screen 70 is transparent, and vice versa. In other words, the two screens have exactly the characteristics of a photographic negative and a transparent positive printed therefrom. The screens may conveniently be formed in this manner.

In Fig. 1, I have, for example, shown the screens 7, 70 divided regularly according to a checker-board pattern. The rectangular divisions of 7 and 70 are identical in shape and dimensions; but, it will be seen that each square, which is transparent in 7, is opaque in 70. Likewise, each square, which is opaque in 7, is transparent in 70.

It will be apparent that, according to this arrangement, duplicate images of the field 2 will be cast on the screens 7 and 70. A ray of light emanating from any given point in the field 2 will be projected to duplicate focal points on 7 and 70. It is important to note, however, that if the position of the said point in the image on 7 falls on an opaque section, the position of the point on the image formed on 70 will lie on a transparent section. Thus, the ray of light from the said point will pass through the screen 70 and will impinge on the photo-sensitive element 60; whereas, the duplicate ray falling on 7 will be stopped thereby and will not reach 6.

It follows, therefore, that a ray of light emitted by any given point in the field 2 will be transmitted in duplicate as far as screens 7, 70; but, thereafter, only one of the duplicate beams of light will be further transmitted to the photo-sensitive device, the other one being stopped by the screen. Thus, light from any given point may reach one or other of the photo-sensitive elements, but not both of them.

Therefore, if an object 3, in the field 2, be mobile, and if it be at such distance from the lens 1, and of such dimensions that the image thereof on the screens 7, 70 is of the same order as the divisions of the screens, the image of the object 3, as the latter moves across the field 2, will alternately appear on opaque and on transparent divisions on the screens. When it appears on a transparent portion of 7, it will stimulate 6, but will be on an opaque section of 70 and will not affect 60. Likewise, after it has moved a short distance, it will come on to an opaque area on 7 and on to a transparent portion of 70, when it will affect the photo-sensitive element 60, but not 6. Thus, movement of 3 will give rise to alternating stimulation of the photo-cells 6 and 60. The frequency of these alternations will depend upon the velocity of movement, the distance of the object 3 from the lens 1, and upon the smallness of the divisions on the screens 7 and 70.

If, on the other hand, there be no movement of any kind occurring within the field 2, no matter what degree of differing color or shade may be distributed, according to any kind of pattern, in the background and objects comprising the field 2, the light reaching the photo-sensitive elements 6 and 60, respectively, will be substantially equivalent and of steady value. Variations in the intensity of the general illumination of the field 2 will cause like variation in the stimulus of both 6 and 60.

I, therefore, provide an electric circuit arranged, first, to be energized in accordance with the difference in the photo-electric currents, due to 6 and 60; and, secondly, to be responsive only to the rate of change, or first derived function, of the difference between the photo-electric currents of 6 and 60.

Thus, I connect the photo-sensitive elements 6 and 60 in a balanced or bridge circuit 9, which includes ratio resistors 10 and 100 that, preferably, are adjustable for balancing. The bridge circuit 9 is energized from a suitable source 11. The electro-responsive circuit is connected, as shown in Fig. 1, across the normally equi-potential points in the bridge circuit 9 between which, it will be readily appreciated, no voltage will exist except there be a difference in the amount of light reaching 6 and 60. When an object of discernable color or shade difference, relative to the surroundings in the field 2, moves across the field so that the photo-sensitive elements 6 and 60 receive, alternately, an inequality in light-stimulus, due to the action of the screens 7, 70, a corresponding alternating voltage will be generated across the normally equi-potential points of the bridge 9.

I connect, therefore, across the equi-potential points, a condenser 12 in series with a voltage-drop-producing element, such as a resistor 13. This provides means responsive to rate of change, or to the alternating component, of the difference voltage. It will be apparent that, according to this arrangement, the current flowing in the resistor 13 will be the charge and discharge currents of the condenser 12. Thus, the voltage drop across the resistor 13 will be proportional to the rate of change, or the alternating component, of the difference between the light affecting 6 and 60.

Movement of an object in the field 2 will, therefore, tend to set up an alternating voltage drop across 13.

If, for any reason, such as detail composition of the field 2, or inequality of the characteristics of 6 and 60, or change in the sensitivity thereof, the photo-electric currents in 6 and 60 are not exactly balanced, a corresponding steady difference voltage may appear across the normally equi-potential points of the bridge 9. But, this condition will cause no current to flow in the resistor 13, nor any voltage drop across the latter. A voltage drop across 13 may be caused by movement within the field 2 and by that condition exclusively.

I, therefore, associate the voltage drop across the resistor 13 with any suitable electron discharge, space-current, or other apparatus for the amplification and detection of the effects set up by movement of the object 3. I wish particularly to point out an important feature of my invention in this connection.

The amplitude of the alternating light-difference affecting the photo-sensitive devices 6, 60 may, due to the smallness of the object 3, be extremely minute. But, due to the novel features of my invention, it is possible to employ much greater effective gain in amplification of the currents set up by the movement of the object than has been possible in systems hitherto known. This is because the effect, due to movement of the object, is a qualitative effect and not merely a quantitative change. As such, it is manifestly more readily detectable.

In a photo-electric system operating in accordance with the change in the total amount of illumination affecting the photo-sensitive element, due to the presence or absence in the optical field of a small object, the sensitivity of the system to detect such an object cannot be indefinitely extended merely by increasing the gain of the amplifiers associated with the photo-sensitive element. Such systems are actuated in accordance with the ratio between the light, affecting the photo-sensitive system, which is dependent on the object in response to which the system is to function, and the light, independent of the object, which reaches the photo-sensitive device. The limiting feature is this ratio. Increased amplification is of no value since it increases both of these components in the same proportion.

According to my invention, I may provide amplifying means having any desirable amount of gain in order to provide sensitive response to movement of objects in the field 2. When there is no movement, the voltage-drop across the resistor 13 is zero. There is no other effect present in my photo-electric system tending to produce an alternating current component. Only when an object moves across the field 2 is an alternating current component created.

In Fig. 1, I show, by way of example, a simple detecting arrangement comprising an electron discharge device 15, energized from a suitable source 14. In the anode circuit is included a relay, or other suitable device, 16, having contacts 17, adapted to actuate any desired signal, control or other system (not shown in the drawings). The drop across the resistor 13 is applied between the grid and cathode of the electron discharge device 15, according to the usual arrangement of a bias detector, a suitable bias source being included in the grid connection. Under normal conditions, no current will flow in the winding of the relay 16. When, however, there is movement of an object in the field 2, producing an alternating current in the resistor 13, an alternating voltage will be impressed between the grid and cathode of 15, and a pulsating current will flow in the relay winding. Obviously, as many stages of amplification as are desirable may be interposed between the resistor 13 and the relay 16.

While I have shown in Fig. 1 an elementary embodiment of my invention, in order more clearly to explain the more important principles on which it operates, I desire to point out that many other amplifying and detecting arrangements and other additional refinements, such as will be apparent to those skilled in the art, may, with advantage, be employed in conjunction with my improved photo-electric system.

As I have pointed out, extreme amounts of amplification may be made use of in conjunction with my invention, because none of the variations and extraneous effects, which set limits to the sensitivity of photo-electric systems hitherto known, are encountered in my improved system.

While I have shown screens 7, 70 as being divided according to a regular checker-board pattern, by way of explanation of the principles which my invention embodies, it is to be pointed out, not only that irregular or other patterns and arrangements of division may be used, but, further, that additional and novel results may be achieved by special forms of division of the screens 7, 70.

Figure 2:
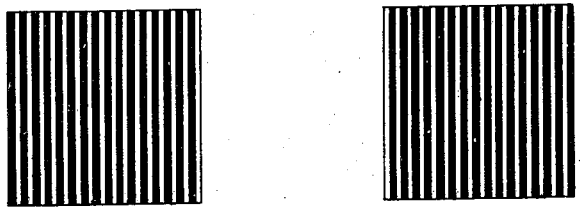

In any application in which, due to the essential nature of the case, the motion of the object takes place entirely, or principally, in one plane only, any other component of the motion being of no significance, it is not necessary to utilize screens 7, 70, divided in checker-board pattern, as shown in Fig. 1. For example, in a system primarily intended to be actuated by a vehicle traveling along a highway, and moving transversely across the field of view in a horizontal plane, screens divided vertically only, as shown in Fig. 2, may be used. It is obvious that only the horizontal component of the motion, in such an application, will be of significance. Any vertical motion which might occur, due to irregularity of the surface of the highway, would be irrelevant to the object of the application.

The effect of a screen of this form will be that the apparatus will be responsive only to the horizontal component of motion, since only movement in this direction will set up alternating components in the photo-electric currents. Similarly, I may orient the axis of the dividing lines according to any other desired angle, if it be desired to provide a system for responding selectively to a given directional component of motion.

Figure 3:
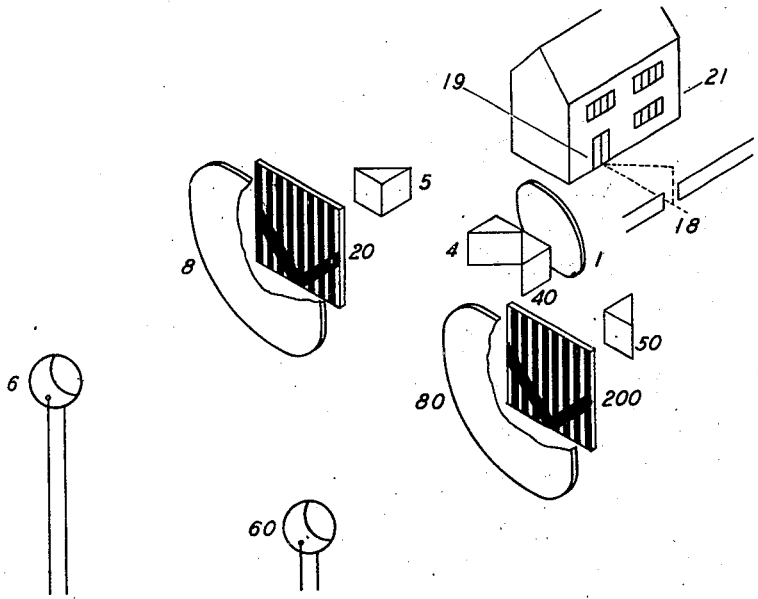
Figs. 2, 3 and 4 are diagrammatic representations of modifications of my invention as shown in Fig. 1.

In Fig. 3, I show a further type of screen adapted to be used for applications associated with the detection of intrusion or trespass of unauthorized persons into any designated area. Assume, for example, that authorized persons have frequent occasion to pass from the gate 18 to the door 19 in Fig. 3, which shows an optical system substantially identical with the system in Fig. 1, except that screens 20, 200 of a special type are employed. The bridge circuit, amplifier, and relay, (not shown in Fig. 3) are understood to be the same as in Fig. 1.

According to my invention, authorized persons will be instructed to proceed from the gate 18 to the door 19 by some other path than a direct line, such as, for example, taking a designated number of paces towards the corner 21, and then turning toward the door 19. On the screens 20, 200, areas corresponding to the designated path are either left transparent or rendered opaque. Thus, the apparatus is not responsive to any movements within this area. But, any unauthorized person, being unfamiliar with this system, will tend, on passing through the gate 18, to walk straight to the door 19. The image of the intruder will now move over parts of the screens 20, 200, which are divided into alternate transparent and opaque sections. Alternating impulses will be set up and current will flow in the resistor 13. Thus, the relay 16 will be actuated, which may operate suitable devices for announcing the presence of the unauthorized person.

Utilizing screens uniformly graduated, I may provide amplifying means to amplify the alternating current flowing in the resistor 13, and may apply this amplified energy to frequency-indicating apparatus. If an object pass across the optical field 2, at a designated distance from the photo-electric equipment, and at right angles thereto, such as, for example, an automobile traveling along a highway, the frequency of the amplified alternating current will be a function of the linear velocity of the object. Should the speed exceed a predetermined value, signalling or registering apparatus may be actuated. For example, photographic means embracing the automobile and, in addition, a clockface, showing time and date, may be set in action.

Figure 4:

By employing screens in the form shown in Fig. 4, indication of the sense of motion may be obtained. In Fig. 4, the screens have vertical divisions and are thus intended to be actuated by horizontal motion. The vertical divisions are not, however, of uniform width, but are made of increasing width from left to right. Thus, if an object traveling at uniform speed moves so that its image traverses the screen from left to right, a signal of decreasing frequency will be furnished by apparatus arranged to amplify the current in resistance 13. If the object move in the opposite direction, the frequency will increase. Thus, if these signals be transmitted or registered in any suitable manner, an indication or record of the sense of the motion of the object may be obtained. For example, if this signal be listened to on a telephone, it will have a clearly defined characteristic sound in accordance with the sense of movement. Alternatively, the signal may be recorded on an oscillograph or string galvanometer.

It will be apparent to those skilled in the art that a system constructed in accordance with Fig. 1 or Fig. 2 will give a certain degree of selective action in accordance with the relation between the size of the screen divisions, the dimensions of the object, and its distance from the photo-electric system. Thus, the screen may be so chosen that it responds most readily to objects of a certain size. It is apparent that if two objects pass across the field of view, one of which is of such dimensions that the image is of the same width as two divisions of the screen, and the size of the other is such that the image is of the same width as one division on the screen, the latter will cause a much stronger signal than the former. On the other hand, if it is desired to avoid such discrimination, apparatus having screens, as illustrated in Fig. 4, may be employed. It will be obvious that if screens so divided be used, the apparatus cannot be unresponsive throughout its area to any given size of object.

For the indication of blemishes in materials, arrangements substantially in accordance with Fig. 1 may be used. However, due to the more simple conditions of application, correspondingly simpler arrangements may be employed.

In the case of a system for the inspection of material, it may be assumed that the material may be exhibited at a fixed distance from the lens 1 on a belt conveyor or the like; or, the material may be a continuous roll, such as cloth or paper, which may continuously pass in front of the photo-electric apparatus. But, it may reasonably be assumed that it will be convenient for the motion of the material to be in a given direction and at a controllable velocity, which latter feature may be taken advantage of in carrying my invention into practice.

Thus, since only motion in a single direction need be envisaged, screens of the form illustrated in Fig. 2 may be employed.

Figure 5:
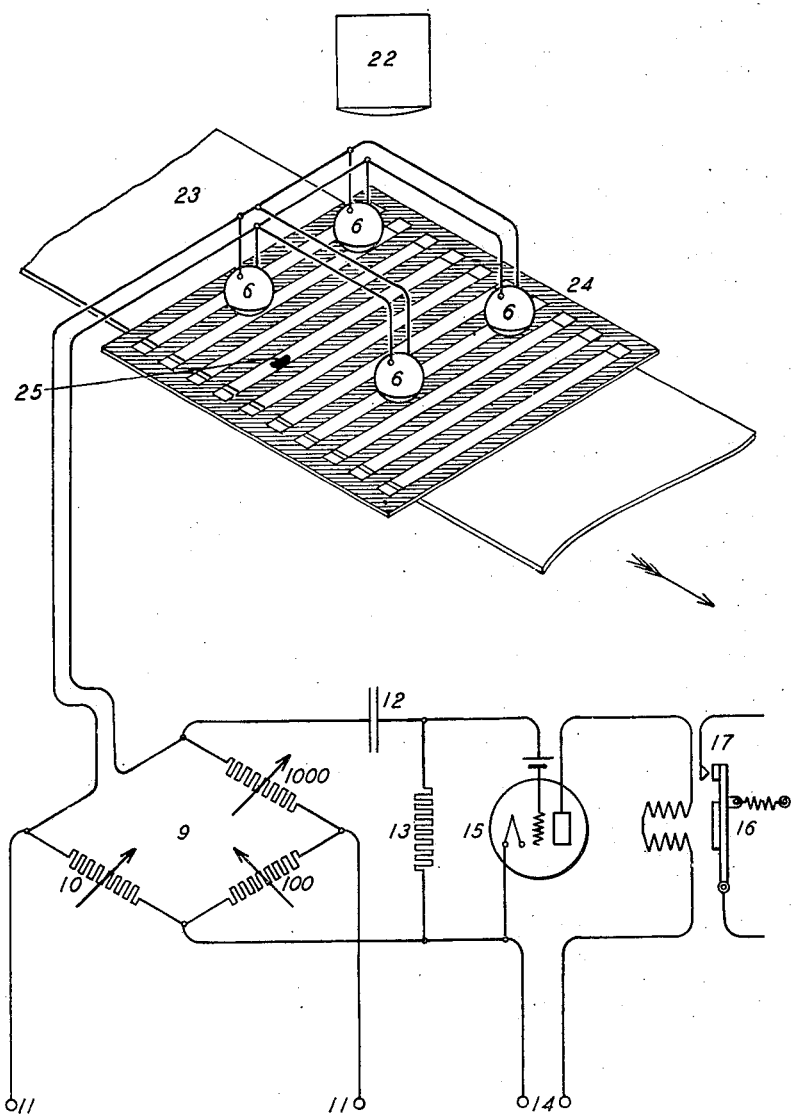
Fig. 5 is a diagrammatic representation of an embodiment of my invention adapted to be operated by imperfections in a material.

As an alternative to the arrangement shown in Fig. 1, I may dispense with an objective optical system and may use the arrangement shown in Fig. 5.

In Fig. 5, I show a source of illumination 22, preferably energized from a battery or filtered rectified source, directed upon the material 23, which is arranged to be continuously conveyed in the direction of the arrow. A plurality of photo-sensitive elements 6, connected in parallel, are disposed so that the light reflected from the material 23 impinges thereon. Above the material 23, I provide a screen or grid 24 having alternate transparent or opaque divisions at right angles to the movement of 23. Obviously, a simple perforated plate of metal or other suitable material will serve this purpose. The screen may, with advantage, be black.

The photo-sensitive elements 6 I connect in one arm of a bridge 9, associated with the electro-responsive circuit including the resistance 13, condenser 12, electron discharge device 15 and relay 16, as in Fig. 1.

According to this arrangement, it will be apparent that movement of any homogeneous material across the illuminated area, and underneath the screen 24, will cause no fluctuation in the intensity of the light reflected on to the photo-sensitive elements 6. But, if there be on the material 23 a dark spot 25, this dark spot will pass successively into the open spaces of 24, where it will cause a minute reduction in the photo-electric current, and behind the opaque portions of the screen, where it will have no effect on the photo-electric currents. Thus, as the spot 25 passes across the area exhibited to the photo-electric system, there will occur pulsations in the photo-electric current which will cause alternating currents to flow in resistance 13, thus operating the relay 16. As explained in reference to Fig. 1, the alternating current energy appearing in the resistance 13 may be amplified to any desired degree, since no current can appear therein, except there be a departure from uniformity in the material.

Since the material may be passed before the photo-electric system at a pre-determined speed, the frequency of the alternating current in resistance 13 will always be the same for any given velocity of movement. Thus, in Fig. 5, the relay 16 may consist of any well-known and suitable type of vibrating or resonant relay, or electro-responsive device, tuned to this frequency.

Figure 6:
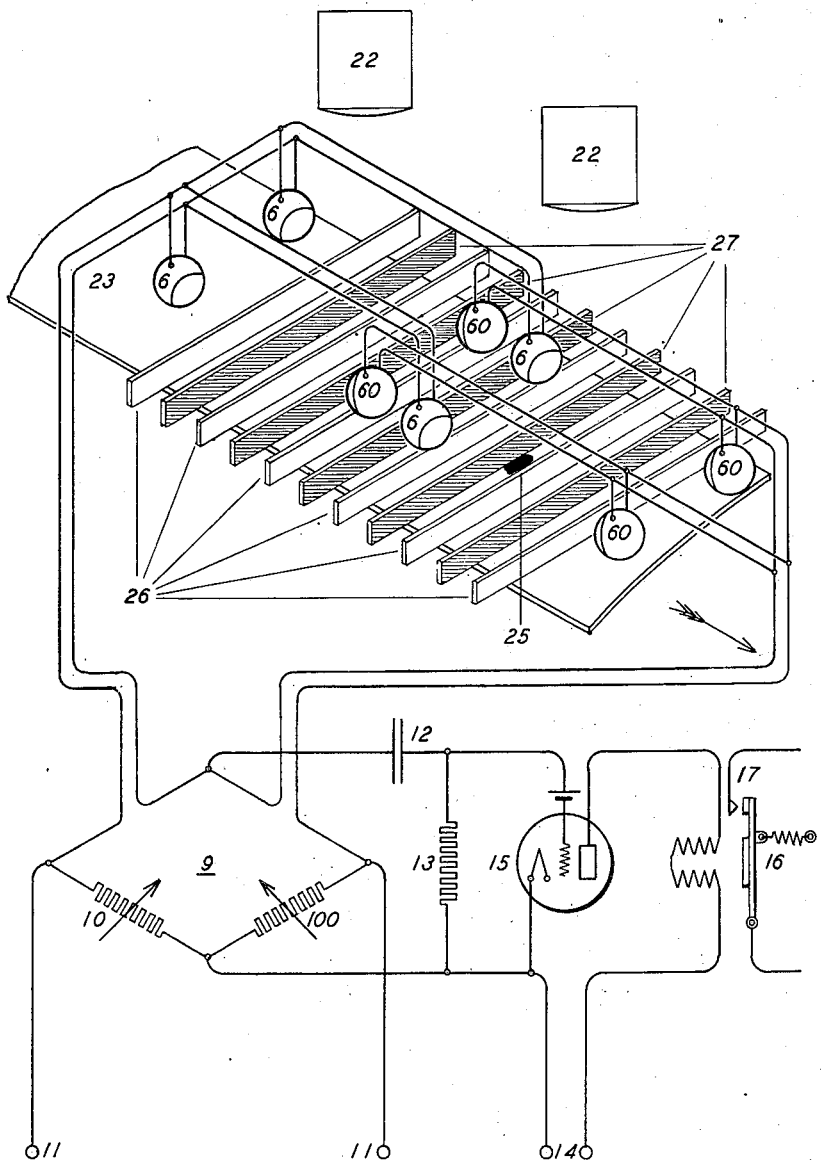
Fig. 6 is a diagrammatic representation of a modification of my invention as shown in Fig. 5.

In Fig. 6, I show an arrangement for inspecting material in which I employ a detecting circuit having photo-electric elements in two arms of the bridge 9, which may be used with the identical circuit shown in Fig. 1.

In the system shown in Fig. 6, the material 23 is arranged to be continuously in motion, passing under a screen, after the manner of Fig. 5. The screen, in Fig. 6, consists of a plurality of vertical barriers. The barriers are, alternately, reflecting and non-reflecting. Thus, as shown in Fig. 6, barriers 26 are provided with reflecting surfaces on both sides. Barriers 27 have non-reflecting surfaces. Thus, light from a blemish 25, while it passes from a barrier 26 to a barrier 27, will be reflected forwards in the direction of motion of the material. Having passed beneath the barrier 27, the light will be reflected backwards.

Thus, as illustrated in Fig. 6, I illuminate the material from above by means of a source, or a plurality of sources, of light 22, and provide a plurality of photo-sensitive elements 6 and 60, the elements 6 being inclined in the direction of motion of the material, and the elements 60 being inclined against the direction of motion. Thus, light from a spot 25, passing from a barrier 26 to a barrier 27, will be reflected so that the light-reduction, due to the dark spot 25, will affect photo-sensitive elements 60, but not 6. Likewise, as the spot passes from 27 to 26, it will affect the photo-sensitive elements 6, but not 60.

Accordingly, the effect of the travel of the spot 25 will, alternately, affect the photo-sensitive elements 6 and 60, setting up alternating components in the photo-electric currents. The action of the bridge 9 and its associated circuit will be precisely as in Fig. 1. The relay 16 may be similar to that described with reference to Fig. 5.

It is to be understood that any desired number of photo-sensitive elements may be employed, all of the elements 6 being grouped and connected in one arm of the bridge 9, and all of the elements 60 being grouped and connected in the adjacent arm of the bridge. Suitable screens, covers and/or lenses (not shown) may be arranged in association with the photo-cells 6 and 60, to direct the light more effectively and to avoid any undesired light from reaching the photo-cells.

It will be apparent to those skilled in the art that the foregoing arrangements are not limited to the detection of dark spots on lighter material, but are equally adapted for use in the case of blemishes of light color on dark material, and that, accordingly, while I have shown in Figs. 5 and 6, by way of example, the photo-sensitive elements 6 and 60 connected in parallel, these may be connected in series, if this arrangement should be preferable. Likewise, it will be apparent to those skilled in the art that I may adopt similar arrangements in the case of transparent or semi-transparent material, such as the material known as cellophane and the like, the source of illumination being on one side of the material and the photo-electric apparatus on the other.

I wish to point out some of the especial advantages of my invention, as applied to the inspection of materials, in comparison with the prior art.

The effectiveness of a photo-electric inspection system, on an energy or efficiency basis, will be in accordance with the number of micro-watts of power, and the duration thereof, delivered by the light sensitive circuit to the amplifier for any given size and character of spot. It will be apparent to those skilled in the art that, for any given speed of motion, each complete alternating impulse caused by the exposure and withdrawal of the spot from the effective field of view of the photo-cell represents a definite unit of energy delivered to the input of the amplifier. The amplifier is connected to actuate a relay or work device. It is obvious that the amount of energy received by the work device, for any given speed, is a measure of the effectiveness of the system.

According to the methods hitherto known and used, a small spot on a sheet of material sets up only a single complete alternation, or impulse, of photo-electric current, as the spot enters, and departs from, the field of view of the photo-cell. But, in the present invention, instead of a single alternating impulse, caused by a single exposure of the spot to the photo-electric system, a large number of such alternating impulses are set up. The total energy available is thus increased in the ratio of the number of alternating cycles set up by the divisions of the screens. Since the defect or spot sets up an extended series of alternating cycles, at a pre-determined frequency, the use of a resonant detecting device, according to my invention, enables a very high order of sensitivity to be attained. Defects which are so slight that the amplitude of a single cycle, or impulse, would be so minute as to be impossible of detection, are, in this manner, able to produce a cumulative or building-up effect in respect of the resonant device, so that the energy, represented by the series of impulses, is integrated, and the relay is energized in accordance with the total energy, rather than the instantaneous amplitude.

Prior systems have also been limited in respect of the speed at which the material may be passed. Where only a single impulse is furnished, it is obvious that, if the material be traveling at a high speed, the electrical transient, caused by a small spot, will be of extremely short duration, substantially less than the operating time of any practical kind of electro-mechanical work device.

In the present invention, therefore, in addition to the energy increase referred to above, the duration of the action of the spot on the photo-electric system may likewise be indefinitely extended by increasing the number of divisions in the screens. This permits of passing the material at speeds materially faster than heretofore.

While I have described the operation of my invention as being actuated by "light," I wish it to be clearly understood that I am not to be limited to effects associated with visible light. It will be obvious to those skilled in the art that my invention may be used in connection with any wave motion effect capable of refraction and reflection, such as ultra-violet, infra-red rays, etc., and that responsive means, other than photo-cells, susceptible of actuation by such wave lengths, such as thermo-responsive devices and the like, may likewise be employed without departing from the spirit of my invention.

Although I have chosen certain specific embodiments of my invention for illustration, many modifications thereof are possible and will be apparent to those skilled in the art to which it pertains. My invention, therefore, is not to be limited except insofar as is necessitated by the prior art and the spirit of the appended claims.

I claim:

1. A photo-electric system including optical means whereby the light derived from an optical field is directed, through separate light channels, on to a plurality of photo-sensitive elements, said light channels including screens which are divided into transparent and opaque portions, said screens being divided in like manner, the respective transparent and opaque portions being complementary, whereby the light effect due to an object moving in said field is caused alternately to affect said photo-sensitive elements, a balanced electric circuit including said photo-sensitive elements whereby a voltage is set up in accordance with the difference between the light stimuli of said photo-sensitive elements, and means responsive to rate of change of said voltage to effect a circuit controlling action in accordance with the movement of said object.

2. Apparatus for detecting the sense of motion of a moving object in a field of view including a fixed screen comprising portions having different light characteristics arranged alternately, means for imaging the field of view thereon, and a photo-electric device arranged to receive light from said screen, said portions increasing in size from one side of the screen to the other, whereby the resulting change in frequency of the output of said photo-electric device indicates the sense of motion of said object.

3. Apparatus for detecting a moving object in one portion of a field of view while insensitive to a moving object in another portion thereof including a fixed screen, means for imaging said field of view thereon, and a photo-electric device arranged to receive light from said screen, that part of the screen which receives the image of said one portion of the field of view being constructed with portions having different light characteristics arranged alternately and the remainder of the screen having the same light characteristics.

4. Apparatus for detecting movement of an object in a field of view comprising means for producing a plurality of similar images of said field of view, separate members arranged to receive said images and comprising portions adjacent each other having different light characteristics, corresponding parts of said images being formed on portions of said members having different light characteristics, and means for giving an indication in response to the alternate changes in light from said members.

5. Apparatus for detecting movement of an object in a field of view comprising means for producing a plurality of similar images of said field of view, a separate screen for receiving each of said images, each screen comprising portions having different light characteristics arranged alternately, said screens being so positioned that corresponding parts of said images engage the screens at portions thereof having different light characteristics, a photo-electric device arranged to receive light from each screen, and means for giving an indication in response to the alternate actuation of said devices.

6. Apparatus for giving an indication in response to the movement of an object in a field of view comprising a plurality of screens, means for imaging said field of view thereon, said screens each comprising alternate transparent and opaque portions, the transparent portions of one screen corresponding with respect to the images to the opaque portions of the other screen, and indicating means responsive to the inverse changes in light transmitted by said screens.

7. Apparatus for giving an indication in response to the movement of an object in a field of view comprising a plurality of screens, means for imaging said field of view thereon, said screens each comprising alternate transparent and opaque portions, the transparent portions of one screen corresponding with respect to the images to the opaque portions of the other screen, a photo-electric device arranged to receive the light transmitted by each screen, a bridge circuit having adjacent arms including said devices, and indicating means responsive to alternate changes in resistance of said arms.

8. In combination, a plurality of photo-electric devices, means for alternately increasing and decreasing the light affecting each of said devices, the light changes affecting one device occurring at times different from those of the corresponding light changes affecting another device, a bridge circuit having arms including said devices, an input circuit for said bridge circuit, an output circuit therefor including a capacitor, and a device operative in response to the current passing said capacitor.

9. Apparatus for detecting a portion of an object having a different light characteristic from the other portions thereof comprising a photo-electric device, a source of light, means whereby said light is received by said device from at least one narrow band of said object, means for producing relative movement between said means and said object, whereby said device is affected intermittently by light from each point of said object, and means connected with said photo-electric device and resonant with said intermittent light for giving an indication.

10. Apparatus for detecting a portion of an object having a different light characteristic from the other portions thereof comprising a photo-electric device arranged to receive light from said object, means for producing light and dark bands on said object, means for producing relative movement between the object and the bands whereby each point on said object is alternately light and dark with a predetermined frequency, and means resonant with said frequency for giving an indication in response to the operation of said photo-electric device.

11. Apparatus for detecting a portion of an object having a different light characteristic from the other portions thereof comprising a photo-electric device arranged to receive light from said object, a screen arranged to divide the light received by the photo-electric device from the object into a series of bands whereby, as the object moves relatively to the screen, each point of the object passes the bands with a predetermined frequency, and means resonant with said frequency for producing an indication in response to the operation of said photo-electric device.

12. Apparatus for detecting a portion of a moving object having a different light characteristic from other portions thereof comprising a plurality of photo-electric devices, a reflector adjacent said object and arranged to reflect light from approaching portions of said object toward one device and to reflect light from receding portions of said object toward another device and means responsive to an alternate actuation of said devices for giving an indication.

13. Apparatus for detecting a moving object in a field of view, comprising a photo-electric system including a stationary member having a plurality of areas having different light characteristics arranged alternately, and means for imaging said field of view upon said member so as to cause said object to be imaged alternately on said areas, having different light characteristics, whereby continuous movement of said object within said field of view causes an alternating component in a photo-electric current generated by said photo-electric system, together with means for giving an indication substantially proportional to the rate of change of said photo-electric current.

14. Apparatus for detecting movement of an object in any direction in a field of view of substantially constant illumination comprising means for producing an image of said field of view, an image receiving member comprising portions having different light characteristics arranged alternately in each of two directions substantially at right angles to each other, and a photo-electric device arranged to receive light from said member.

15. Apparatus for detecting movement of an object in any direction in a field of view of substantially constant illumination comprising a plurality of screens each having a plurality of transparent and opaque portions arranged alternately in each of two directions substantially at right angles to each other, means for focusing an image of said field of view on each of said screens whereby the transparent portions of one screen and the opaque portions of another screen receive corresponding portions of said images, a photo-electric device arranged to receive light from each screen, and means for giving an indication in response to the alternate actuation of said devices.

16. Apparatus for detecting motion of a moving object in a field of view, said object being movable in either of two opposite directions, including a fixed screen comprising portions having different light characteristics arranged alternately, means for imaging the field of view thereon, and a photo-electric device arranged to receive light from said screen, said portions increasing in size from one side of the screen to the other, whereby the frequency of the output of said photo-electric device varies in a characteristic manner when the movement of the object takes place in one of said two opposite directions and varies in a different manner when movement takes place in the other of said directions.

17. Apparatus for detecting movement of an object in a field of view comprising, a plurality of light-sensitive devices, a first optical system embracing said field of view for directing light therefrom to one of said devices, a second optical system for directing light therefrom to another of said devices, so that movement of an object anywhere in said field of view causes variations in the light impinging upon both of said light-sensitive devices, means for causing a difference of phase between the light variations respectively affecting said devices, and means responsive to an instantaneous difference between the photo-electric currents derived from said light-sensitive devices.

18. Apparatus for detecting movement of an object which is entirely extraneous to, and unrelated with said detecting apparatus, comprising, optical means embracing the field of view surrounding said object for producing an image thereof, an image-receiving member comprising portions arranged adjacent to each other having different light characteristics, means for producing photo-electric currents which vary when the image of said object moves from one to another of said portions of the image-receiving member, and means responsive to rate of change of said currents.

19. Apparatus for detecting the movement of an object in a field of view of substantially constant illumination, comprising, an image receiving member having portions of one light characteristic separated by portions of a different light characteristic, means for focusing an image of said field of view on said member, and circuit controlling apparatus controlled by light received from said member, said apparatus being constructed to be unresponsive to substantially steady light and to be responsive to recurring changes in light.

20. Apparatus for detecting the movement of an object in a field of view, comprising, an image receiving member having portions of one light characteristic separated by portions of a different light characteristic, means for focusing an image of said field of view on said member, and circuit controlling apparatus controlled by light received from said member, said apparatus being constructed to be responsive to light changes caused by movement of said object and to be unresponsive to changes in the general illumination of said field of view.

21. A photo-electric system comprising, a first light sensitive device, means for directing light from a field of view to said device, means interposed between said field of view and said device for causing movement of an object across said field of view to produce fluctuations in the light received by said device, a second light sensitive device, means for illuminating said second device from said field of view, and means controlled jointly by said first and second light sensitive devices, so as to be unresponsive to changes in the general light intensity of said field of view, for giving an indication in accordance with the movement of said object.

22. Apparatus for detecting the movement of an object in a field of view of substantially constant illumination, comprising a screen having portions of alternately greater and less transparency, means for focusing an image of said field of view on said screen, a photoelectric device arranged to receive light from said screen, and signalling apparatus controlled by said device, said apparatus including a capacitor in the input side thereof whereby the apparatus is adapted to respond to recurring light changes due to the movement of said object.

23. A photo-electric system comprising, a photo-electric device subjected to an optical field of view of substantially constant total illumination, means for producing a series of fluctuations in the photo-electric current flowing in said device in response to a single movement of an object across said field of view, and means responsive in accordance with the rate of change of said photo-electric current.

24. A photo-electric system comprising a photo-electric device subjected to an optical field of view of substantially constant total illumination, means interposed between said photo-electric device and its field of view for producing a series of fluctuations in the light received by said device in response to a single movement of a free object across said field of view, and electro-responsive means controlled by said photo-electric device and responsive solely to fluctuations in light received thereby.

25. A photo-electric system comprising, a photo-electric device subjected to an optical field of view of substantially constant total illumination, means for producing an image of said field of view, an image receiving member comprising portions having different light-transmitting characteristics arranged alternately for producing fluctuations in the light received by said device in response to the movement of a free object transverse said photo-electric system, and electro-responsive means controlled by said photo-electric device and responsive solely to fluctuations in the light received thereby.

26. The method of detecting the movement of an object in a field of view, which comprises, producing an image of said field of view, dividing said image into portions having different light characteristics whereby the moving image of said object successively passes through said portions, and producing a signal in response only to recurrent changes in light from said image.

27. The method of detecting the movement of an object by means of a light sensitive device, which comprises, forming an image of a field of view including the object, projecting said image onto said device, intercepting uniformly distributed portions of said image from said device, whereby movement of said object across said field of view produces fluctuations in the light falling on said device, and producing an effect proportional to the frequency of said fluctuations for giving an indication of the movement of said object.

ALAN S. FITZ GERALD.